United States Patent [19]

Moustakas et al.

[11] Patent Number: 4,780,714
[45] Date of Patent: Oct. 25, 1988

[54] SELECTIVE VOLTAGE SUPPLY SYSTEM FOR DATA NETWORK DISTRIBUTOR

[75] Inventors: Steven Moustakas; Jan Goerne, both of Munich, Fed. Rep. of Germany

[73] Assignee: Siemens Aktiengesellschaft, Berlin and Munich, Fed. Rep. of Germany

[21] Appl. No.: 888,234

[22] Filed: Jul. 21, 1986

[30] Foreign Application Priority Data

Jul. 19, 1985 [DE] Fed. Rep. of Germany ....... 3526364

[51] Int. Cl.$^4$ .................. H04Q 9/00; G06F 15/56
[52] U.S. Cl. ................ 340/825.500; 307/43; 307/38
[58] Field of Search ............ 307/441, 29, 30, 38, 307/43, 70, 126; 340/825.5; 370/92

[56] References Cited

U.S. PATENT DOCUMENTS

| | | | |
|---|---|---|---|
| 4,371,789 | 2/1983 | Chen et al. | 307/38 |
| 4,546,351 | 10/1985 | Nambu | 340/825.5 |
| 4,593,349 | 6/1986 | Chase et al. | 307/29 |
| 4,608,504 | 8/1986 | Yamamoto | 307/441 |
| 4,635,195 | 1/1987 | Jeppesen et al. | 370/92 |

FOREIGN PATENT DOCUMENTS

WO83/03178 9/1983 PCT Int'l Appl. .

OTHER PUBLICATIONS

Siemens Telecom Report, vol. 3 (1980) pp. 203-206.
Proceedings of the IfIP Working Group 6-4, "Local Networks for Computer Communications" (1981) pp. 43-60.
Telecom Report 5 (1982) "Local Area Networks'-'—Hochgeschwindigkeitsnetze fur die Burokommunikation.

Primary Examiner—Donald J. Yusko
Attorney, Agent, or Firm—Hill, Van Santen Steadman & Simpson

[57] ABSTRACT

In a data network distributor adapted to connect a plurality of data stations with each other directly, and with remote stations over a network bus, a selective voltage supply system allows units shared in common with the local data stations to be powered only as needed, and to draw power from the individual data stations requiring service. Individual power sources in each data station are connected to a common line through decoupling diodes and current limiting resistors, and the common line supplies a plurality of voltage supply units which are operative to supply power to commonly used units as needed, including transmitting and receiving units for the network bus, a data diversion device for diverting local communications from the network bus, and a common control circuit for data collision recognition.

3 Claims, 1 Drawing Sheet

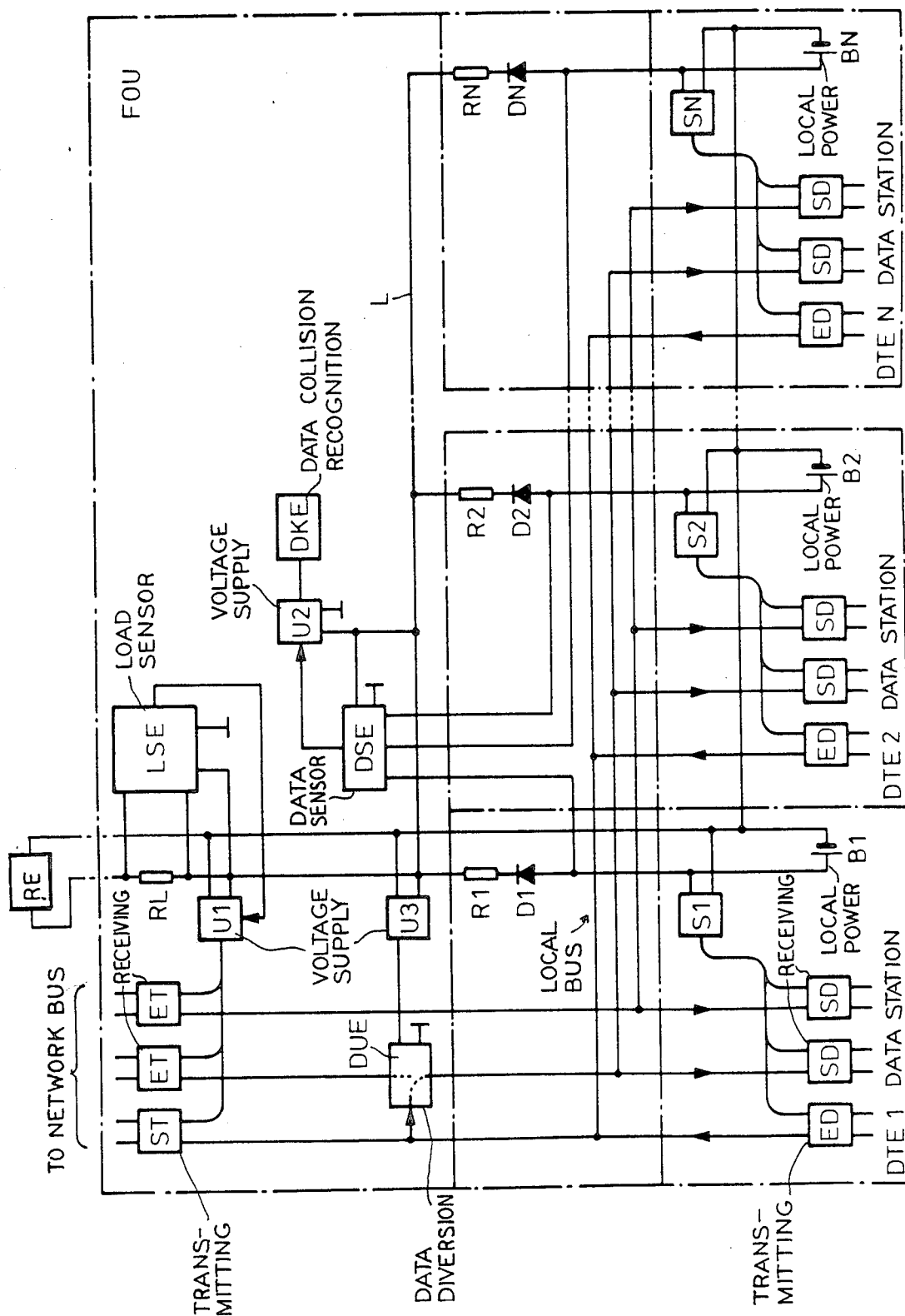

SELECTIVE VOLTAGE SUPPLY SYSTEM FOR DATA NETWORK DISTRIBUTOR

BACKGROUND

The present invention relates to a selective voltage supply system for a data network distributor connected to a plurality of data stations and adapted to allow communication between individual ones of said data stations, and to other stations of a network bus.

A data network distributor allows a number the data stations to be interconnected for communication with each other, over a network bus, and allows locally situated data stations to communicate with each other without requiring the network bus. When the network bus is used, transmitting and receiving apparatus is employed for the bus, which is shared by a group of local data stations. The distributor is equipped with a control circuit for avoiding collisions when two or more local data stations attempt to use the network bus at the same time. The distributor also has an electronic data diversion device, by which traffic between local data stations is diverted directly to the destination station, without requiring use of the network bus.

Network distributors of the type described above serve essentially the purpose of expanding the number of data stations which may be served with a single network, with a group of data stations being connected to the network bus only through the distributor. The electronic data diversion device allows communication among the data stations locally, without requiring use of the network bus, and does not use the transmitting and receiving systems associated with the network bus. Since only the data communications directed to remote stations are routed to the network bus, the maximum number of data stations connected to the bus network can be considerably increased.

In connection with such a distributor, various switching devices are required for accomplishing the electronic data diversion referred to above, for recognizing and avoiding the data collision, and for the selection of the transmitting and receiving systems for data transmission over the network bus. In conventional distributor designs, the voltage supply is designed in accordance with the maximum allowable number of data stations which may be simultaneously operative, so that a relatively high requirement for voltage and current supplies is necessary. Distributors of this type are commercially available from a variety of sources, such as the fan-out unit "Intellink Ethernet Cluster Module" marketed by Intel Corporation, and the "Derep" marketed by Digital Equipment Corporation. These systems make use of a voltage supply main which is always designed to accomodate the maximum possible expansion. This requires a relatively large and expensive system and system components, including voltage transformers, filtering network devices, etc., which take up considerable space within the distributor unit, and are very costly. It is therefore desirable to provided a system for reducing the size and cost of the voltage supply equipment for such a distributor.

BRIEF DESCRIPTION OF THE PRESENT INVENTION

In the present invention, the voltage supply system for the distributor is not defined by the maximum possible expansion and therefore attains the desirable object of reducing the amount of space required for the voltage supply equipment.

In one embodiment of the present invention, three separate voltage supply units are provided for supplying, respectively, operating voltage and current to transmitting and receiving equipment for the network bus, a control circuit for data collision recognition, and the unit for electronic data diversion, respectively. These three voltage supply units are connected to the voltage sources of various data stations through decoupling diodes, so they are active only when required to accomplish their respective functions, after which they are shutoff, enabling the conservation of power until needed for further operation.

By use of the present invention, the voltage supply system for the distributor can be designed independently of a common voltage supply main, and is connected with the individual voltage supply present in each data station. Thus, the voltage supply of the distributor of the present invention is not designed with a predetermined capacity, based on maximum expansion, but always exhibits the performance capacity which is required for proper functioning, in accord with the number of data stations which may be connected to the distributor any at given time. The individual voltage sources of all the data stations are connected in parallel via the decoupling diodes, and thus supply the load-dependent current level required for operation of the shared network transmitting and receiving equipment, the data collision recognition system, and the data diversion system, such current being supplied at a common reference potential over a common line.

In a further embodiment of the present invention, the distributor is provided with a load resistor interconnected with a common line of the network bus, and means for controlling operation of the transmitting and receiving systems in response to recognition of a voltage drop across the resistor. Accordingly, the voltage supply for the transmitting and receiving systems is switched on only when the distributor is experiencing communication between one of its data stations and a remotely located data station, over the network bus.

In another development of the invention, two local data stations may be interconnected by use of an electronic data diversion device, and its voltage supply is enabled only when required. Also the control circuit for data collision recognition is powered only when more than one data station attempts to send messages at the same time, and is then operative in order to initiate suitable switching devices to inhibit transmission from all but one of the competing local data stations. The voltage supplies for accomplishing these functions are not switched on until there is a need for these particular services.

BRIEF DESCRIPTION OF THE DRAWING

Reference will now be made to the accompanying drawing, which illustrates a functional block diagram of a distributor constructed in accordance with an illustrative embodiment of the present invention.

DESCRIPTION OF THE PREFERRED EMBODIMENT

The accompanying FIGURE shows a distributor FOU of the type which is sometimes referred to as a "fan-out" unit. It is equipped with a transmitting device ST and one or more receiving devices ET for interconnecting one or more of a plurality of local data stations DTE1 ... DTEN with a network bus. The bus (not shown) is adapted to be connected to the transmitting and receiving devices ST and ET and a common line of the bus is connected to a line L through a load resistor RL.

Each of the local data stations DTE1 ... DTEN has a unit ED adapted to receive a message from an input at the station and to forward it over a local bus to the transmitting unit ST of the network bus. Each local data station also has one or more units SD which are interconnected over local buses from the network bus via the receiving units ET, and which transmit messages received from the network bus to an output at the data station, such as a printer, or the like. An electronic data diversion device DUE has its input connected to the local bus, and is adapted to divert data transmissions from a unit ED at one of the local data stations directly to the unit SD of another local station, when such is the destination of the communication. Such communications do not reach the network bus, and therefore the network bus is not overloaded with the traffic represented by such local communications.

A data collision recognition unit DKE is provided, for allowing arbitration between competing communications from more than one of the local data stations in response to operation of a data sensor device DSE, which recognizes simultaneous calls from a plurality of local data stations.

Each of the local data stations DTE1 ... DTEN is provided with a local power source B1 ... BN for powering its transmitting and receiving equipment. One terminal of all of the local power sources B1 ... BN is connected through a decoupling diode D1 ... DN and a current limiting resistor R1 ... RN to a common line L which serves as the common current supply for powering the various units which are shared by the data stations DTE1 ... DTEN, such as the transmitting and receiving devices ST, ET, the data collision recognition unit DKE and the data diversion device DUE.

Three voltage supply units U1, U2, and U3, are provided for supplying power respectively to the transmitting and receiving devices ST and ET, the data collision recognition unit DKE and the data diversion device DUE. In order to optimize power comsumption of the distributor FOU, the voltage supply units U1, U2 and U3 are activated only as needed. That is, the first voltage supply unit U1 is switched-on only when the transmitting and/or receiving units ST, ET become active in order to transmit data between a local station and the network bus. This condition is monitored by use of the load sensor device LSE which is connected across the load resistor RL. Whenever the transmitting or receiving devices ST and ET require power, a voltage drop is developed across the load resistor RL, and the load sensor device LSE responds to this voltage drop and activates the power supply unit U1.

The second voltage supply unit U2 is connected to the data sensor device DSE in order to supply power to the data collision recognition unit DKE, whenever two or more of the data stations DTE1 ... DTEN attempt to send data communications simultaneously. In that event, all but one of the stations is inhibited from transmitting data by conventional switching means (not shown).

The third voltage supply unit U3 is activated whenever one of the local data stations DTE1 ... DTEN seeks to transmit data, so that the electronic data diversion unit DUE can divert the data directly to one of the local data stations when use of the network bus is not required.

As a result of the distributor features described above, the power consumption of the distributor is held to a minimum and rises only when an increasing number of data stations DTE are additionally connected to the distributor.

Each of the local data stations DTE1 ... DTEN has a switch device S1 ... SN connected with its units ED and SD, and with its local power source B1 ... BN. The switch device is operative to supply power from the local power source B1 ... BN, when needed, for transmitting and receiving. Whenever a data transmission is being originated, the local power source B1 ... BN is connected into the circuit shown in the drawing, supplying current to one input of the data sensor device DSE and to the voltage power supply units U1 and U3 through a diode D1 ... DN, and the switch unit S1 ... SN is operated by means at the data station to close a connection between the local power source B1 ... BN to the unit ED. The unit U3 supplies power to the diversion device DUE.

The unit U3 may be constructed, with a contact for example, as a relay, which closes the current-supplying path from the line L and a return line to the data diversion device DUE when a tranmission-originating signal is received from any station. The transmission-originating signal ends when the communication ends, and the voltage supply units U1, U2 and U3 are then switched off.

When a transmission is originated by one of the local data stations, a current flows through the load resistor RL, and through an effective resistance RE in transceiver apparatus associated with the network bus. When a transmission originates elsewhere in the network, with the destination of one of the data stations DTE1 ... DTEN, then a voltage appears across the terminals of the effective resistor RE, and a current flows through the load resistor RL, and through the input resistance, for example, between the right hand terminals of units U1 and U3. The current drop across RL is sufficient to trigger the load sensor device LSE which turns on the power unit U1, which supplies power to the receiver units ET from the network bus (appearing across RE).

The data sensor device DSE contains a logic circuit adapted to produce an output whenever transmission-originating signals are produced simultaneously by two or more of the local data stations DTE1 ... DTEN, by virtue of connecting two or more of the local power sources B1 ... BN into the circuit as shown. Conveniently, this may be made up of conventional AND and OR gates for producing an output signal in accordance with the expression, for example (for three sations A, B and C)

$$A \cdot (B+C) + B \cdot C$$

The voltage supply unit U2 may be constructed, for example, as a relay with a contact for closing the connection between the line L and the power input of the data collision recognition unit DKE.

The load sensor device LSE may be constructed, for example, with an operational amplifier responsive to the voltage drop across the load resistor RL, and the voltage supply unit U1 may be constructed, for example, as a relay for closing the power connection between the line L and the transmitting and receiving devices ST, ET in response to the output of the load sensor device LSE.

The construction of the units U1, U2, and U3 may be any conventional mechanical or electronic relay design with the requisite current-carrying capacity. The switch units S1 . . . SN are also of any conventional design.

In the FIGURE, the ground or return for control signals is indicated by a conventional ground symbol. The power lines to the units ST, ET, DUE, DKE and U2, for example, are shown as single lines for simplicity but represent both the current supply and return lines.

It will be apparent that various additions and modifications may be made in the apparatus of the present invention without departing from the essential features of novelty thereof, which are intended to be defined and secured by the appended claims.

What is claimed is:

1. In a data network distributor, adapted for connection to a plurality of first data stations and to a network bus for allowing said first data stations to communicate with other data stations over said network bus, each of said first data stations having a local power source for supplying power to its individual transmitting and receiving devices, and said distributor having transmitting and receiving equipment connected to said network bus, a control circuit for data collision recognition, and a data diversion device, a selective voltage supply system comprising, in combination; a plurality of individual circuits connected to each of the local power sources of said first data stations, each said circuit having a decoupling diode and a current limiting resistor connected in series, and a common line interconnecting all of said circuits, a first voltage supply unit adapted to selectively connect said common line to the power input of said transmitting and receiving units connected with said network bus, a second voltage supply unit connected to supply power to said data collision recognition unit, a third voltage supply unit adapted to selectively supply power to said electronic data diversion unit, and means connecting said common line which each of said first, second and third voltage supply units.

2. Apparatus according to claim 1, including a load resistor connecting in series with a common line of said network bus, and a load sensor device connected to said load resistor and responsive to a voltage drop thereacross, and means for activating said first voltage supply unit in response to a voltage drop across said load resistor.

3. Apparatus according to claim 1, including a data sensor device connected to at least two of said first data stations, said second voltage supply unit being activated in response to operation of said data sensor device upon recognition of two or more of said first data stations attempting simultaneous transmissions.

* * * * *